Nov. 7, 1939.                    R. H. GERARD                    2,178,890
                        TIMING DEVICE FOR CONTROL CIRCUITS
                    Filed June 6, 1938              3 Sheets-Sheet 1
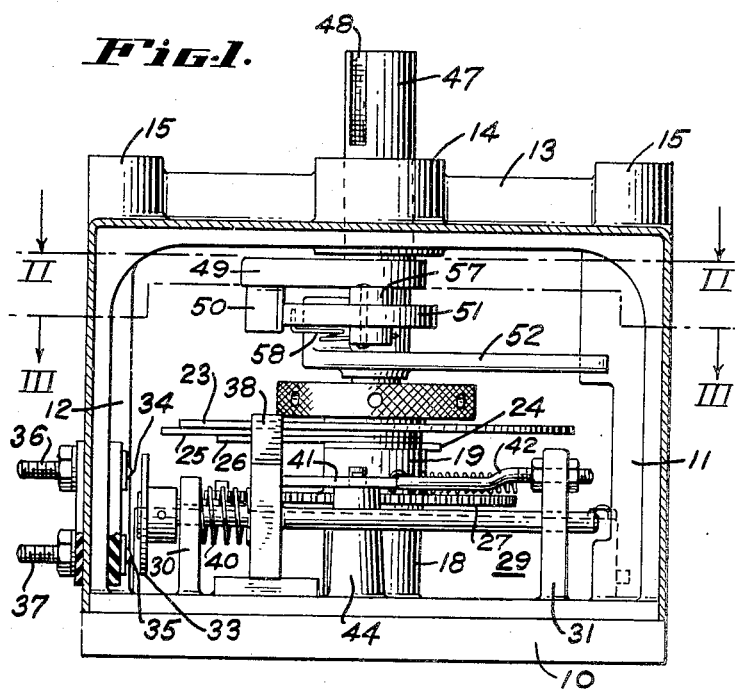
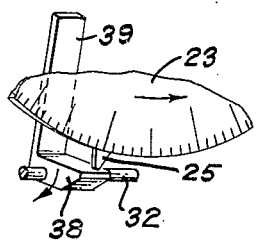
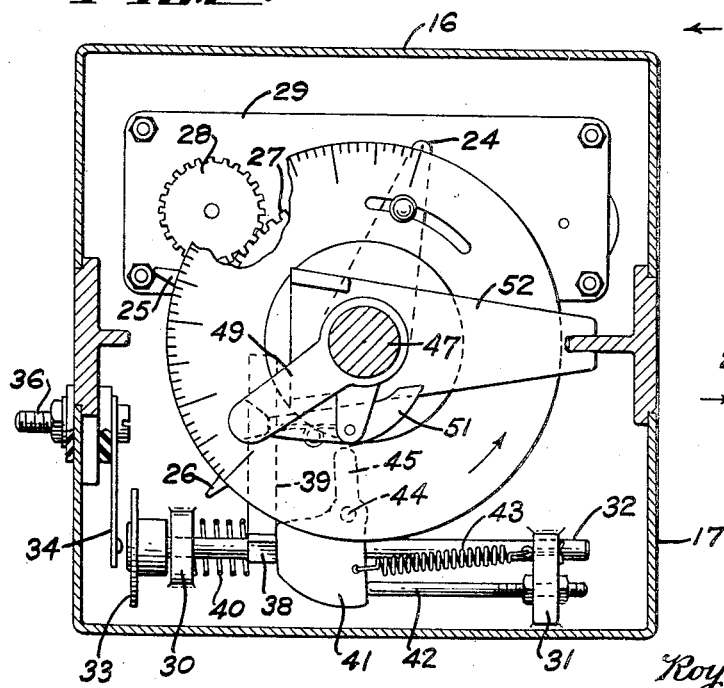
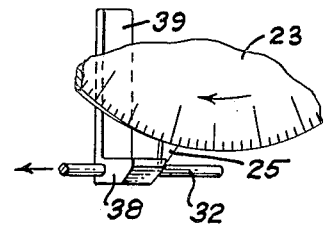
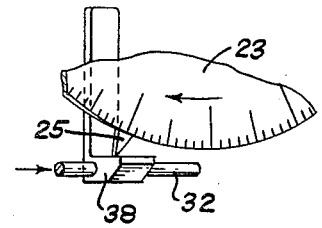
INVENTOR.
Roy Hanmore Gerard
BY
ATTORNEY.

Nov. 7, 1939.    R. H. GERARD    2,178,890
TIMING DEVICE FOR CONTROL CIRCUITS
Filed June 6, 1938    3 Sheets-Sheet 2
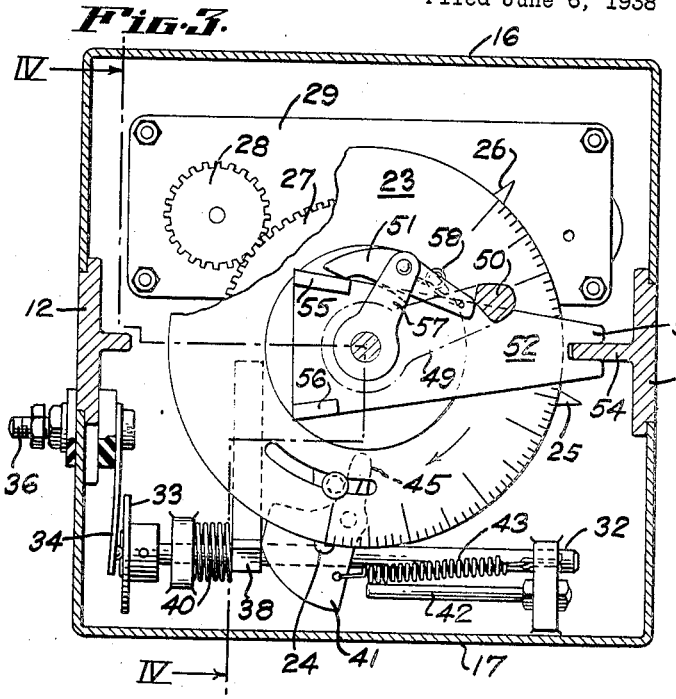
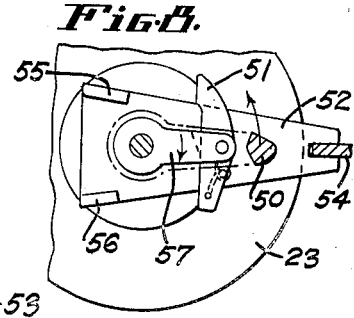
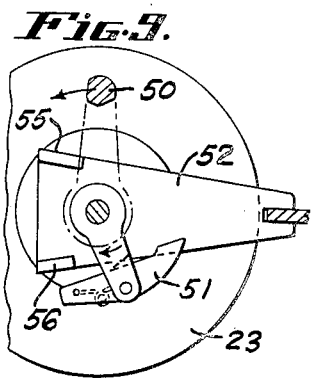
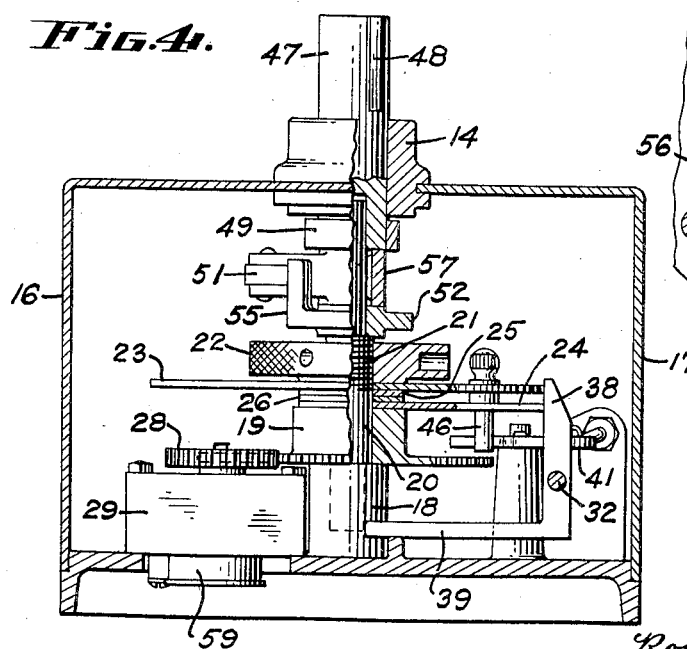
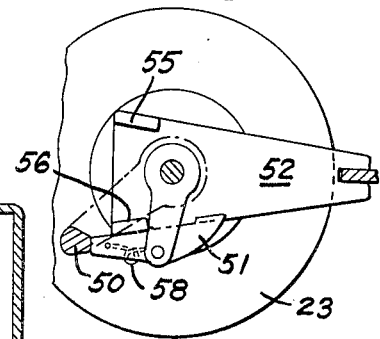
INVENTOR.
Roy Hanmore Gerard
BY
Wm. H. Atkinson
ATTORNEY.

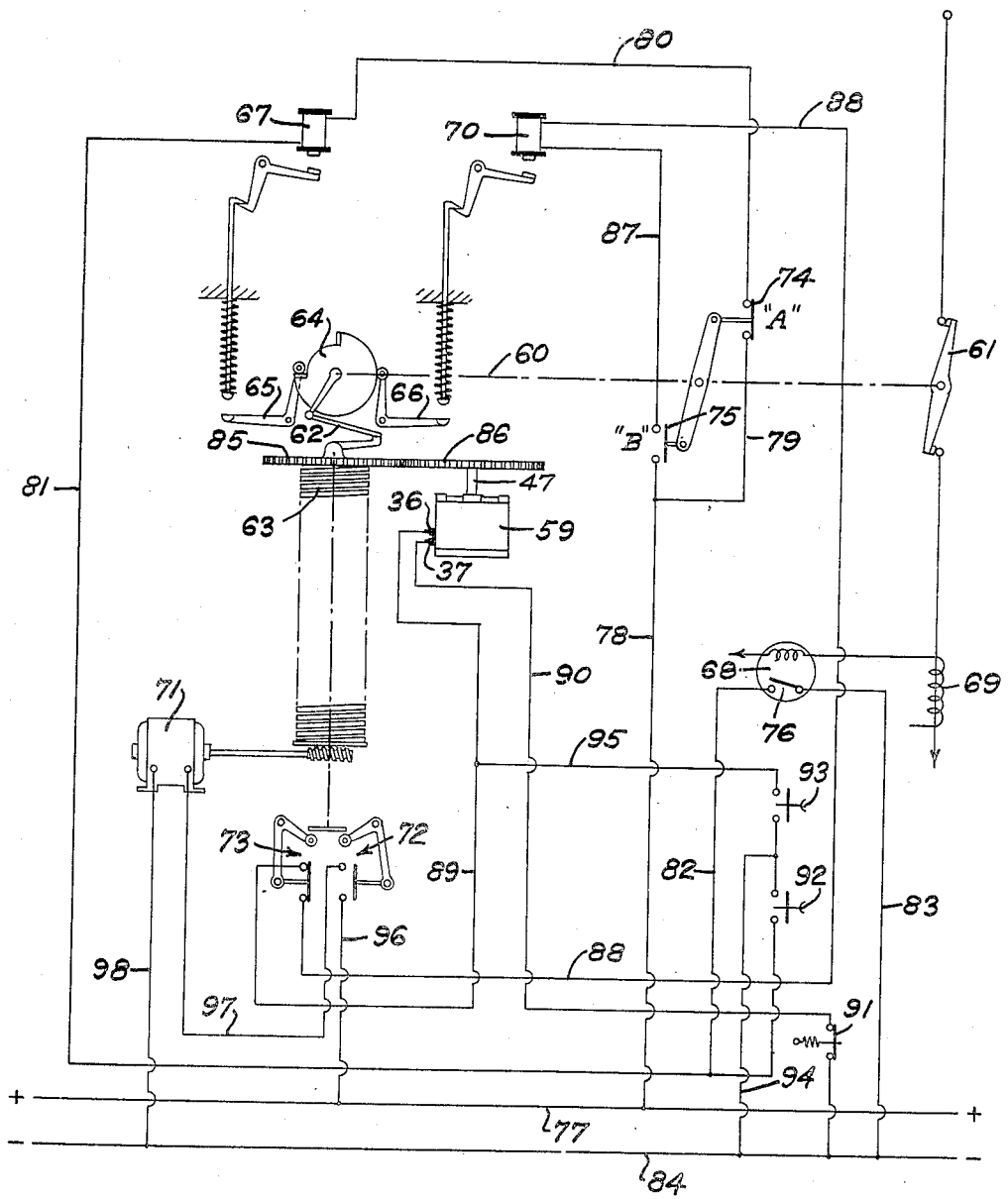

Patented Nov. 7, 1939

2,178,890

UNITED STATES PATENT OFFICE 2,178,890

TIMING DEVICE FOR CONTROL CIRCUITS

Roy Hanmore Gerard, Oakland, Calif., assignor to Pacific Electric Manufacturing Corporation, San Francisco, Calif., a corporation of California Application June 6, 1938, Serial No. 212,163

14 Claims. (Cl. 200—38)

My invention relates to improvements in circuit controlling devices, and more particularly to a device for controlling a circuit a plurality of times in succession at predetermined intervals.

Electric power transmission circuits are usually provided with automatic circuit breakers that are arranged to be opened on the occurrence of an abnormal circuit condition in order to protect the circuit and apparatus connected thereto, and inasmuch as continuity of service may thus be interrupted, it is a further practice to provide these circuit breakers with an automatic control which will reclose the circuit breakers one or more times in succession at intervals, so that if the abnormal condition has disappeared from the circuit, service will be promptly restored. In order, however, that the line and circuit breaker may not be subjected to unnecessary shocks, it is desirable to limit the number of times the circuit breaker may be reclosed, so that if the abnormal condition prevails longer than a predetermined time, the circuit breaker will remain open. Moreover, in order to require the minimum personal attention, it is desirable to have the circuit breaker controlling device self-restoring when the circuit breaker is reclosed any number of times up to and including the predetermined number and remains closed due to the disappearanc of the abnormal condition from the circuit. Furthermore, it is often desirable to have the time intervals such that the successive closures occur at increasing intervals, as by so doing it is possible, without impressing too frequent shocks on the line and circuit breaker, to test the permanency of the abnormal condition and restore service promptly upon the disappearance thereof.

An object of my invention is to provide an improved circuit controlling device which is operative automatically to control a circuit a plurality of times in succession at readily variable predetermined intervals and within a predetermined time, at the expiration of which further operation may be suspended and which is particularly adapted for controlling the reclosing of a circuit breaker under the conditions hereinbefore set forth, although its application is not so limited.

For a better understanding of the invention reference should be had to the accompanying drawings, wherein there is shown by way of illustration and not of limitation a preferred form of apparatus embodying the invention.

In these drawings;

Figure 1 is a side elevation of the device with the cover in section to disclose the interior arrangement, Figure 2 is a horizontal sectional view, taken along line II—II of Figure 1, with parts broken away to show details of construction, Figure 3 is a view similar to Figure 2, taken along line III—III of Figure 1, showing the parts in another operative position, Figure 4 is an end elevation of the device, taken along line IV—IV of Figure 3, Figures 5, 6 and 7 are fragmentary views, showing the manner in which the circuit controlling switch is operated by the timing device, Figures 8, 9 and 10 are fragmentary views, showing details of the rewinding mechanism and the manner in which the parts cooperate, and Figure 11 is a schematic circuit diagram, showing the invention associated with a spring operated reclosing circuit breaker.

While the device of the present invention may find many useful applications, wherein an electrical control circuit is required to be opened and/or closed a plurality of times at predetermined variable intervals after a predetermined condition is established, the main field in which the device will find an immediate application is, as has been previously stated, for controlling the successive reclosings of an automatic reclosing circuit breaker. When used in this manner, an opening of the circuit breaker in response to an overload will set the device in operation to effect one or more automatic reclosings of the circuit breaker and at the same time prevent a final reclosing thereof should the overload or fault be of a permanent character.

In connection with automatic reclosing circuit breakers, it is necessary that a circuit breaker operating mechanism be provided which will function independently of the condition of the circuit in which the circuit breaker is connected. In some instances the circuit breaker is adapted to be operated by an electric motor or magnetic means which obtains its energy from a storage battery, but the most common practice is to provide the circuit breaker with a spring actuating mechanism that is adapted to be wound by a motor controlled either from the line or from an associated storage battery.

A circuit breaker of the spring operated type, suitable for control in accordance with the present invention, is fully described and claimed in the application of August C. Schwager, Serial No. 162,498; filed September 4, 1937, and entitled Reclosing circuit breaker. This application is assigned to the assignee of this application, and the present invention will be described in connection with a reclosing circuit breaker of this latter type.

As illustrated in Figures 1 to 4 of the drawings, the elements which comprise the present circuit timing device are mounted upon a suitable metallic base, designated by the numeral 10. This base 10 has two oppositely disposed upstanding posts 11 and 12, between the upper ends of which there is a connecting web 13 that carries a central bearing 14. At the point of juncture between the posts 11 and 12 and the web 13 there are suitable bosses 15 by means of which the device may be attached to any associated apparatus. At each side of the posts 11 and 12 and the web 13 there is provided a suitable cover 16 and 17 which serves to completely enclose the apparatus when in operation. Formed upon the base 10 and centrally below the bearing 14 there is a second bearing 18 upon which there is journaled a rotatable member 19. The rotatable member 19 has an upstanding central shaft 20 which is threaded, as at 21, to receive a clamping nut 22 that serves to clamp a graduated disc 23 and a plurality of adjustable arms 24, 25 and 26 thereupon in any desired radially spaced relation, as may be readily determined by graduations provided upon the disc 23. The rotatable member 19 carries an integrally formed gear 27 which, as illustrated in Figure 2 of the drawings, meshes with a driving gear 28 that is driven by a clock spring motor 29 having a speed control escapement, which will be described in more detail hereinafter.

As shown in this latter figure of the drawings, the clock spring motor 29 is secured to the base 10 at one side of the central bearing 18 and is positioned below the gear 27 so that it will not interfere with the free rotation of the rotatable member 19 and the disc 23 or the arms 24, 25 and 26. At the other side of the bearing 18 upon the base 10 there are provided two spaced supports 30 and 31 upon which there is slidably mounted a shaft 32 that carries a contact bridging member 33 which is adapted to establish a circuit between spaced contacts 34 and 35 connected respectively to terminals 36 and 37 that are mounted in insulated relation upon the post 12.

As shown in Figures 2 and 3 of the drawings, the contacts 34 and 35 extend outwardly from the post 12 and into the path of movement of the contact bridging member 33 where they will be engaged when the supporting shaft 32 is moved to the left, as shown in Figure 3 of the drawings. Fixed upon the slidable shaft 32 there is also an operating member 38 that is adapted to be engaged by the adjustable arms 24, 25 and 26, carried by the rotatable member 19. This operating member 38 is normally held in its operative arm engaging position by an underslung inwardly projecting weight or arm 39 which will tend to hold the upwardly extending portion of the member 38 in the path of the arms 24, 25 and 26, when these arms move in an operative direction. Associated with the shaft 32 and the operating member 38 carried thereupon, there is a spring 40 which tends to bias the shaft 32 and the contact bridging member 33 out of engaging relation with the contacts 34 and 35.

As shown in Figure 2 of the drawings, when the operating member 38 and the contact bridging member 33 are biased into their open circuit position, the member 38 will be held against a lever-like member 41 that is held in the path of the operating member 38 by a stop 42 and a tension spring 43. The member 41 is pivotally mounted upon a support 44 and has an inwardly projecting arm 45 which is adapted to be engaged by a downwardly extending pin 46 carried by the radially adjustable arm 24 upon the rotatable member 19, as is clearly shown in Figure 4 of the drawings.

As shown in Figures 1 and 2 of the drawings, the parts are in the positions assumed when the spring motor is in its unwound condition, and with the circuit breaker to be controlled in its closed circuit position. For the purpose of connecting the device with a circuit breaker and thus time and control the reclosing operations thereof, the invention contemplates a permanent positive connection between a rotatable part of the circuit breaker and the timing device, by which a substantially 180° rotation will be imparted to the rotatable member 19 during the opening movement of the circuit breaker contacts. For this purpose the present device includes an outwardly extending shaft 47 that is journaled in the bearing 14 in axial but independently rotatable relation with the rotatable member 19. This shaft 47 is shown as having a keyway 48, by means of which it may be connected in any suitable manner to a portion of the circuit breaker mechanism which will impart the above referred to 180° rotation to the rotatable member 19. At its lower end the shaft 47 carries a radially extending crank arm 49 having a downwardly extending detent engaging boss 50 through which a driving connection is established with the rotatable member 19 by means of a pivotally mounted detent 51 carried by the member 19. Mounted in cooperating relation with the detent 51 there is also a detent controlling member 52 that is non-rotatably mounted upon the axis of the rotatable member 19. At its inner end this member 52 surrounds the axis of the rotatable member 19 and the shaft 47, and at its outer end it is provided with a forked end 53 that engages a web 54 formed upon the post 11. The member 52 also has two upstanding flanged surfaces 55 and 56 that are adapted to control the position of the detent 51 and thus establish and release the driving connection between the shaft 47 and the rotatable member 19, as will be determined by the operation of the circuit breaker under control. At this point it will be noted that the detent 51 is pivoted intermediate its ends upon a radially extending arm 57 so that its opposite ends are adapted to engage the flanged surfaces 55 and 56 formed upon the member 52 as it moves with the member 19. It will also be noted that the detent 51 is provided with a light spring 58 that is adapted to bias its end out of the path of the downwardly extending boss 50 upon the crank arm 49 when this boss 50 is not in actual pressure exerting engagement therewith. In other words, while the spring 58 is adapted to bias the end of the detent 51 out of the path of the boss 50, when it is not held against this bias by the flange 56 upon the member 52, it will be understood that this spring 58 is of such a light character that it will not move the detent 51 out of engagement with the boss 50 when the latter member is exerting a pressure thereupon, as will hereinafter appear.

For the purpose of explaining the operation of the timing device contemplated by the present invention, reference will first be had to Figures 1 to 10 inclusive, of the drawings, for a description of the operation of the various elements of the device, and following this, the operation of the device in conjunction with a reclosing circuit breaker of the type illustrated in the aforementioned co-pending application filed by August C. Schwager, will be given in connection with Figure 11 of the drawings.

It will be assumed that the shaft 47 of the timing device is connected to a rotating part of a reclosing circuit breaker in such a manner that when the circuit breaker contacts move from their closed to their open circuit position, the shaft 47 will be rotated substantially 180°, or through a half revolution, and that as the circuit breaker contacts are moved from their open circuit position to a closed circuit position, the shaft 47 of the timing device will be moved through a further arc of substantially 180°. In other words, the connection between the reclosing circuit breaker mechanism and the shaft 47 of the timing device will be such that the shaft 47 will be turned through one complete revolution as the circuit breaker contacts move from their closed circuit position, through an open circuit position and into a subsequent closed circuit position. It will also be assumed that the reclosing circuit breaker is provided with an overload relay which will operate to trip and open the circuit breaker upon the occurrence of an overload or other fault upon the line. It will also be assumed that the automatic reclosing mechanism of the circuit breaker is provided with a magnetically actuated trip mechanism that will control and set the circuit breaker reclosing mechanism in operation.

Reference is now specifically made to Figures 1 and 2 of the drawings, which show the elements of the timing device as in the relative positions which they will assume when the circuit breaker to be controlled thereby is in its closed circuit position. Now, with the parts in the positions as shown in these figures of the drawings, it will be understood that when the circuit breaker is tripped, due to an overload or other fault, the driving connection thereof, which connects with the shaft 47 of the timing device, will rotate the shaft 47 through an arc of substantially 180°. This will cause the crank arm 49 at the lower end thereof to carry the boss 50 through an arc of 180°, and because of its engagement with the detent 51 the rotatable member 19 with its radial arms 24, 25 and 26, will be carried around in a counterclockwise direction, as viewed in Figure 2 of the drawings. This counterclockwise rotation of the rotatable member 19 will cause the gear 27 carried thereby, to drive the gear 28 of the spring motor 29 in a spring winding direction, so that immediately upon a release of the rotatable member 19, as will hereinafter appear, the spring motor 29 through its gear 28 and the gear 27 will cause the rotatable member 19 to rotate in a clockwise direction, so as to bring the radial arms 25 and 26 carried thereby into actuating relation with the member 38 that controls the movements of the slidable shaft 32 upon the end of which the contact bridging member 33 is mounted. At this point it should be stated that the spring motor 29 may be of any suitable type. In the particular arangement shown the spring motor gear 28 is conected to a clock spring 59, so that when the gear 28 is rotated in a clockwise direction the spring 59 will be wound up, and associated with the spring 59 there is a speed control escapement which is regulatable to control and vary the speed of the reverse rotation of the gear 28, as when the rotatable member 19 is driven in a clockwise direction by the spring motor 29, as viewed in Figure 3 of the drawings. As shown in this latter figure of the drawings, it will be noted that the crank arm 49 upon the shaft 47 has been moved around in a counter-clockwise direction so as to carry the opposite end of the detent 51 into engagement with the upstanding flange 55 carried by the member 52. At this point the crank arm 49 has reached substantially the position which it will assume when the contacts of the circuit breaker are fully open. When the parts reach this position the detent 51 will be moved out of engagement with the boss 50 by the flange 55 and its biasing spring 58, and as a result the crank arm 49 and the shaft 47 will be free to rotate through the further arc of 180° as the circuit breaker operates into its circuit reclosed position. This movement of the crank arm 49, however, will not occur until the reclosing mechanism of the circuit breaker has been set in operation. In order to provide for an immediate reclosing of the circuit breaker after an opening thereof, due to an overload or other cause, the radial arm 24 which carries the downwardly depending pin 46 is so adjusted upon the rotatable member 19 as to engage the lever arm 45 upon the member 41 and move the contact bridging member 33 into circuit making relation with the contacts 34 and 35 substantially simultaneously with the release of the detent 51 from the boss 50 upon the crank arm 49. This bridging of the contacts 34 and 35 will immediately set the circuit breaker reclosing mechanism in operation, and since the detent 51 has disengaged the boss 50 upon the crank arm 49, the shaft 47 will be free to rotate around into the position where it is shown in Figure 1 of the drawings. This disengagement of the detent 51 with the boss 50 will also release the spring motor 29, and as a result the rotatable member with the graduated disc 23 and its associated radial arms 25 and 26 will be driven in a clockwise direction, so as to bring these radially disposed arms 25 and 26 into cooperating relation with the member 38 to control the subsequent reclosing operations of the circuit breaker.

Now, should the overload still exist, the main contacts of the circuit breaker will be again moved into their open circuit position, where the circuit breaker will remain until the contacts 34 and 35 are again bridged, to thus effect a subsequent actuation of the reclosing mechanism of the circuit breaker. While the shaft 47 and the crank arm 49 are being thus carried around by the reclosing and the subsequent opening of the circuit breaker just described, the rotatable member 19 of the timing device will be rotating in a clockwise direction, as viewed in Figure 3 of the drawings, and when the end of the radially adjustable arm 26 upon the rotatable member 19 engages the member 38, the contact bridging member 33 will be again moved into bridging relation with the contacts 34 and 35 to effect a second reclosing operation of the circuit breaker reclosing mechanism. If the circuit breaker remains closed, the rotatable member 19 will continue to rotate in a clockwise direction until the detent 51 is brought around and into engagement with the flange 56 upon the member 52, as shown in Figure 2 of the drawings, where it will again engage the boss 50 upon the radial arm 49 and be in a position to connect the shaft 47 with the main circuit breaker, and again wind the spring motor 29 upon the occurrence of a subsequent overload or fault upon the line. However, should the circuit breaker fail to remain closed upon its second reclosing, as above described, the shaft 47 and its radial arm 49 will again rotate around through a further arc of 180°, where it will remain until the end of the radially disposed adjustable arm 25 upon the rotatable member 19 engages the member 38, and thus produces a subsequent closing of the circuit between the contacts 34 and 35 by a bridging thereof with the contact 33.

Now, if the overload or fault has been removed from the line prior to this final reclosing operation of the circuit breaker, the parts will remain in the positions illustrated in Figures 1 and 2 of the drawings, where the rotatable member 19 will be held against further clockwise movement by the spring motor 29.

During the above described operation it will be seen that the circuit breaker reclosing mechanism has been subjected to three reclosing operations under the control of the three radially disposed arms 24, 25 and 26, carried by the rotatable member 19. It will also be understood that by adjusting the speed controlling escapement of the spring motor 29 and also the relative positions of the arms 24, 25 and 26 with respect to each other, that the time interval between the subsequent reclosing operations of the circuit breaker may be varied as desired.

Upon referring to Figure 5 of the drawings, it will be noted that when the arms 25 and 26, carried by the rotatable member 19, are moved in a counterclockwise direction with the graduated disc 23, these arms will engage the inside surface of the member 38, so as to tip the same out of the path thereof, without longitudinally moving the shaft 32 upon which the bridging member 33 is mounted, whereas, when the rotatable member 19 is turning in a clockwise direction, as shown in Figure 6 of the drawings, the ends of the arms 25 and 26 will cooperate with the member 38 and move the shaft 32 towards the right, to thus carry the contact bridging member 33 into cooperating relation with the contacts 34 and 35 associated therewith, after which, as shown in Figure 7 of the drawings, the spring 40 will return the shaft 32 and the member 33 towards the right, and thus move the bridging member 33 into its circuit opening position.

Reference is now made to Figures 8, 9 and 10 of the drawings, where in Figure 8, the detent 51 upon the arm 57 of the rotatable member 19 is shown as biased inwardly, so that it is free to move in a clockwise direction, as above described, while the boss 50 upon the crank arm 49 is free to move in a counterclockwise direction therearound. In Figure 9, the detent 51 is shown as approaching its final or stopped position, where it will be held in the path of the boss 50 by the flange 56 upon the member 52, and in Figure 10, the end of the detent 51 is shown as engaged by the boss 50, in preparation for a subsequent winding of the spring motor 29, in the event of an opening of the circuit breaker, due to an overload, fault or other cause. When the timing motor 29 has driven the rotatable member 19 in a clockwise direction and the circuit breaker has failed to remain closed after the final operation of its reclosing mechanism, as effected by the radially disposed arm 25 upon the rotatable member 19, the boss 50 will be left in the position substantially as shown in Figure 3 of the drawings, and as a result it will be necessary to manually close the circuit breaker, in order to set the apparatus in condition for a series of subsequent automatic reclosing operations. This latter feature will prevent too many reclosings of the circuit breaker upon the sustained fault, and insure that the circuit breaker will remain open in the event of a sustained fault upon the circuit protected by the circuit breaker.

Reference is now made to Figure 11 of the drawings, wherein the timing device of the present invention, designated by the numeral 59, is diagrammatically shown as associated with an automatic reclosing circuit breaker of the type illustrated and described in the aforementioned application of August C. Schwager. It will be sufficient for the purpose of this disclosure to state that the circuit breaker described in the aforesaid application has an oscillating shaft 60 upon which there is mounted one or more contact controlling arms 61. The shaft 60 is adapted to be oscillated to open and close a circuit by means of a universal link mechanism 62, which is driven by an energy storing spring 63. The shaft 60 also carries a latching disc 64 with which latches 65 and 66 cooperate. Associated with the latch 65 there is an electromagnetic trip mechanism 67 that is responsive to an overload relay 68 which is connected to the power line by means of a current transformer 69, and associated with the latch 65 there is an electromagnetic trip mechanism 70 that is adapted to release the latch 66 and permit a reclosing of the circuit breaker when the timing device 59 operates to establish a control circuit in which the electromagnetic trip mechanism 70 is connected.

In order to maintain a predetermined amount of stored energy in the circuit breaker operating spring 63, there is provided an electric motor 71 that is adapted to be controlled by an interlocking switch 72 when the spring 63 reaches a predetermined unwound condition, and in order to prevent an actuation of the reclosing mechanism when the spring 63 is in an unwound condition there is also provided an interlocking switch 73 that is adapted to be closed only when the spring 63 is wound sufficiently to provide for a predetermined number of reclosings and a final opening of the circuit breaker. In addition to the interlocking switches 72 and 73, the circuit breaker is also provided with A and B switches, designated respectively by the numerals 74 and 75, which operate, as the circuit breaker is opened and closed, in a manner well understood in the art. When the timer 59 of the present invention is associated with a circuit breaker of this type, and connected up in the manner illustrated in this figure of the drawings, it will be seen that should an overload occur in the circuit in which the circuit breaker is located, the transformer 69 will energize the overload relay 68 and thus close its contact 76 to establish a circuit from a positive bus 77, through conductors 78 and 79, through the A switch 74 and conductor 80, to the electromagnetic trip mechanism 67, and thence through the conductor 81, to conductor 82, through the overload relay contacts 76, and back through a conductor 83 to a negative control bus 84. This will cause the latch 65 to be released, and as a result the control disc 64 upon the shaft of the circuit breaker will be rotated 90° by the spring 63, where the latch 65 will then latch the circuit breaker in its open circuit position. During this movement of the circuit breaker shaft, a gear 85 connected to the driving end of the spring 63 will rotate a gear 86 carried by the shaft 47 of the timing mechanism 59, through an arc of substantially 180°, and as a result the timing mechanism will be set in operation in the manner hereinbefore described. This opening of the circuit breaker contact by an operation of the contact carrying arm 61 will cause the B switch 75

75 to close, and thus establish a control circuit for the electromagnetic trip mechanism 70, so that when the timing device 59 operates to establish a reclosing circuit, as described hereinbefore, a circuit will be established for the trip mechanism 70, and back through the conductor 86 to the interlocking switch 73, conductor 89 to the terminal 36 of the timing device 59, then through the bridging member 33 of the timing device 59 to the terminal 37, through a conductor 90 and an emergency switch 91 to the other or negative bus 84.

In addition to the above described elements, the circuit shown in Figure 11, also includes a push button switch 92, by means of which the electromagnetic latching mechanism 67 may be tripped independently of the overload relay 68, should such an operation be desired. The circuit illustrated also includes a manual push button 93, by means of which the electromagentic trip device 70 may be operated independently of the timing device 59. The circuit for the push button 92 may be traced from the positive bus 77, through the conductors 78 and 79 to the A switch 74, and along conductor 80, through the electromagnetic trip mechanism 67, and through conductor 81 to one side of the push button 92, and thence from the other side of the push button 92, through a conductor 94 to the B switch 75, along conductor 87, through the electromagnetic trip mechanism 70 to conductor 88, through the interlocking switch 73 and conductor 89 to a conductor 95, through the push button switch 93 and along conductor 94 to the negative bus 84.

In order to complete the description of the circuit here shown, it may be added that the spring winding motor 71 is adapted to be connected to the control buses 77 and 84, through conductor 96, the interlocking switch 72 and conductors 97 and 98, in a manner which will be evident from an inspection of the diagram.

With the above described arrangement it will be readily seen that by the control thus established, the timing device 59 will operate in an entirely automatic manner, being first wound by an opening of the circuit breaker, and subsequently operating to effect a series of subsequent closings of the circuit breaker as the rotatable member 19 of the timing device is rotated in response to the spring motor 29, as has been hereinbefore described.

While I have, for the sake of clearness and in order to disclose my invention so that the same can be readily understood, described and illustrated a specific device and arrangement, I desire to have it understood that this invention is not limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is—

1. In a timing device for an electrical control circuit, the combination of an energy storing spring, a movable member adapted to be driven in one direction by said spring and adapted when driven in a reverse direction to wind said spring, means for driving said member in a reverse direction to wind said spring, a releasable connection between said last means and said member adapted to release said member at a predetermined point in its reverse directional movement and permit forward movement thereof by said spring, a governor means associated with said spring and said member adapted to regulate the speed of movement of said member under the influence of said spring, a circuit controlling switch adjacent the path of movement of said member, a plurality of adjustably spaced switch operating members carried by said movable member adapted to engage and operate said switch at predetermined intervals as determined by the spacing of said switch operating members upon said movable member when said member is moved forward under the influence of said spring and governor means.

2. In a timing device for an electrical control circuit, the combination of an energy storing spring, a rotatable member adapted to be rotated in one direction by said spring and adapted when rotated in a reverse direction to wind said spring, means for rotating said member in a reverse direction, a releasable connection between said last means and said member adapted to release said rotatable member at a predetermined point in its reverse rotational movement and permit forward movement thereof by said spring, a governor means associated with said spring and said rotatable member adapted to regulate the speed of rotation of said rotatable member under the influence of said spring, a normally open circuit controlling switch adjacent said rotatable member, and a plurality of spaced switch operating members carried by said rotatable member adapted to operate said switch into its closed position at predetermined intervals as determined by the spacing of said switch operating members upon said rotatable member.

3. In a timing device for establishing an electrical control circuit, the combination of an energy storing spring, a movable member adapted to be driven in one direction by said spring and adapted when driven in a reverse direction to wind said spring, means connected with apparatus to be controlled for driving said member in a reverse direction to wind said spring, a releasable connection between said last means and said movable member adapted to release said member at a predetermined point in its reverse directional movement and permit forward movement thereof by said spring, a governor means associated with said spring and said member adapted to regulate the speed of movement of said member under the influence of said spring, a circuit controlling switch adjacent the path of movement of said member, and a switch operating member carried by said movable member adapted to engage and operate said switch at a predetermined interval after said movable member is released for forward movement under the influence of said spring and governor means.

4. In a spring operated timing device for an electrical control circuit, the combination of an energy storing spring, a member adapted to be rotated in one direction by said spring and adapted when rotated in a reverse direction to wind said spring, means for rotating said member in its reverse direction, a releasable connection between said last means and said member adapted to release said rotatable member at a predetermined point in its reverse rotational movement, a governor means associated with said spring and said rotatable member adapted to regulate the speed of rotation of said member under the influence of said spring, a controlling switch adjacent said rotatable member, a plurality of spaced switch operating members carried by said rotatable member and adapted to engage and operate said switch at predetermined intervals as determined by the spacing of said switch operating members upon said rotatable member.

5. In a spring operated timing means for closing an electrical control circuit, the combination of a pair of stationary control circuit contacts, a contact bridging conductor adapted to bridge said contacts when in one position, spring means for holding said bridging conductor out of engagement with said stationary contacts, a rotatable member adjacent said switch, a spring for driving said rotatable member in a switch operating direction adapted to be wound when said rotatable member is turned in a reverse direction, means for rotating said rotatable member in a reverse direction to wind said spring, means carried by said rotatable member adapted to engage and move said contact bridging conductor into bridging engagement with said stationary contacts and immediately release same for return to its normal open circuit position, and a governor associated with said spring and said rotatable member adapted to permit a rapid rewinding of said spring by a reverse rotation of said rotatable member and provide a governed forward rotation thereof to effect a delayed bridging of said stationary control circuit contacts by said contact bridging conductor.

6. In a spring operated timing means for closing an electrical control circuit, the combination of a pair of stationary control circuit contacts, a contact bridging conductor adapted to bridge said contacts when in one position, spring means for holding said bridging conductor out of engagement with said stationary contacts, a rotatable member adjacent said switch, a spring for driving said rotatable member in a switch operating direction adapted to be wound when said rotatable member is turned in a reverse direction, means carried by said rotatable member adapted to move said contact bridging conductor into bridging engagement with said stationary contacts and immedately release same for return to its normal open circuit position, means for imparting a reverse movement to said rotatable member to wind said spring, a governor associated with said spring and said rotatable member adapted to permit a rapid reverse spring winding rotation of said rotatable member and a delayed slow forward rotation thereof under the influence of said spring, and means whereby the switch operating member carried by said rotatable member may be adjusted upon said rotatable member to determine the time at which the control circuit will be closed by said contact bridging conductor after a winding of said spring.

7. In a spring operated timing means for closing an electrical control circuit, the combination of a pair of stationary control circuit contacts, a contact bridging conductor adapted to bridge said contacts when in one position, spring means for holding said bridging conductor in cooperating relation with said stationary contacts, a rotatable member adjacent said switch, a spring for driving said rotatable member in an operative direction adapted to be wound when said rotatable member is turned in a reverse direction, means carried by said rotatable member adapted to move said contact bridging conductor with respect to said stationary contacts and immediately release same for return to its normal position, means for rotating said rotatable member to wind said spring, a governor associated with said spring and said rotatable member adapted to permit a rapid reverse spring winding rotation of said rotatable member and provide a slower forward rotation thereof, and means whereby the position of the switch operating member carried by said rotatable member may be changed to determine the time interval after a winding of said spring at which said contact bridging conductor will be operated with respect to said stationary contacts.

8. In a spring operated timing means for the reclosing control circuit of a reclosing circuit breaker, the combination of a normally open switch, a rotatable member adjacent said switch, a spring for driving said rotatable member in a switch operating direction adapted to be wound by a reverse rotation of said rotatable member, means forming a one way driving connection operable upon an opening of the reclosing circuit breaker adapted to rotate said rotatable member in a reverse direction to rewind said spring, adjustable means carried by said rotatable member adapted to close said switch after a predetermined forward rotation thereof, and a governor associated with said spring adapted to provide a timed forward rotation of said rotatable member, whereby the adjustable means carried by said rotatable member will close said control switch after a predetermined lapsed time as determined by the adjustment of said adjustable means upon said rotatable member.

9. In a spring operated timing means for the reclosing control circuit of a reclosing circuit breaker, the combination of a control switch, a rotatable member adjacent said switch, a spring for driving said rotatable member in a switch operating direction adapted to be wound by a reverse rotation of said rotatable member, means operable upon an opening of the reclosing circuit breaker adapted to rotate said rotatable member in a reverse direction to rewind said spring, a releasable means adapted to release said rotatable member after a predetermined reverse rotation thereof, whereby said rotatable member will rotate in a control switch operating direction under the influence of said spring, means carried by said rotatable member adapted to operate said switch after a predtermined forward rotation thereof, and a governor associated with said spring adapted to provide a timed forward rotation of said rotatable member, whereby the means carried by said rotatable member will operate the control switch after a predetermined lapse of time.

10. In a spring operated timing device for establishing a reclosing control circuit for a reclosing circuit breaker, the combination of an energy storing spring, a member adapted to be driven in one direction by said spring and adapted when rotated in a reverse direction to wind said spring, means operable upon an opening of the circuit breaker for rotating said member in its reverse direction to wind said spring, a releasable connection between said last means and said member adapted to release said rotatable member when the circuit breaker reaches its open circuit position, a governor means associated with said spring and said rotatable member adapted to regulate its speed of rotation under the influence of said spring, a control switch adjacent said rotatable member for establishing a reclosing control circuit for said circuit breaker, and an adjustable control switch operating member carried by said rotatable member adapted to engage and operate said switch to establish said reclosing control circuit for the circuit breaker at a predetermined lapsed time interval after the circuit breaker has opened as determined by the setting of said switch operating member upon said rotatable member.

11. In a spring operated timing device for a reclosing control circuit of a reclosing circuit breaker, the combination of an energy storing spring, a member adapted to be driven in one direction by said spring and adapted when rotated in a reverse direction to wind said spring, means operable upon an opening of the circuit breaker for rotating said member in its reverse direction to wind said spring, a releasable connection between said last means and said member adapted to release said rotatable member when the circuit breaker reaches its open circuit position, a governor means associated with said spring and said rotatable member adapted to regulate its speed of rotation under the influence of said spring, a normally open control switch adjacent said rotatable member for establishing a reclosing control circuit for said circuit breaker, and a plurality of adjustable switch operating members carried by said rotatable member adapted to successively engage said control switch and close said switch to establish the reclosing control circuit of the circuit breaker at predetermined time intervals after the circuit breaker has opened as determined by the spacing of said switch operating members upon said rotatable member.

12. In a timing device for controlling the lapsed time interval between an opening and a reclosing of an electrically controlled reclosing circuit breaker, the combination of a plurality of terminals to which a control circuit for the circuit breaker is connected, a normally open circuit establishing switch bridging said terminals, a rotatable member mounted adjacent said switch having means carried thereby adapted when said rotatable member rotates in one direction to operate said switch and close a circuit between said pair of stationary terminals, a spring adapted to drive said rotatable member in its switch operating direction and to be wound when said rotatable member is driven in a reverse direction, means operable upon an opening of the circuit breaker for driving said rotatable member in its reverse direction to wind said spring, and a releasable connection between said last means and said rotatable member adapted to disconnect said rotatable member from said means when said spring is wound and permit a rotation thereof in its switch operating direction under the influence of said spring, whereby the control circuit connected to said stationary contacts will be closed by said control switch after a predetermined lapsed time interval.

13. In a timing device for controlling the time interval between a plurality of reclosings of an electrically controlled reclosing circuit breaker, the combination of a plurality of terminals to which the control circuit of the circuit breaker is connected, a normally open circuit establishing switch connected to said terminals, a rotatable member mounted adjacent said switch having radially adjustable means carried thereby adapted when said member rotates in one direction to operate said switch and establish a circuit between said pair of stationary terminals, a spring adapted to drive said rotatable member in its switch operating direction and to be wound when said rotatable member is driven in a reverse direction, a governor associated with said spring adapted to permit a rapid rewinding thereof by rotation of said rotatable member in its reverse direction and to control the speed at which said spring drives said rotatable member in its switch operating direction, means operable upon an opening of the circuit breaker for driving said rotatable member in its reverse direction, and a releasable connection between said last means and said rotatable member adapted to disconnect said rotatable member from said means and permit a rotation thereof in its switch operating direction under the influence of said spring and under the control of said governor, whereby a circuit will be established between said stationary contacts at predetermined lapsed time intervals after the circuit breaker has opened as determined by the radial adjustment of the switch operating means carried by said rotatable member.

14. In a timing device for the control circuit of an electrically controlled reclosing circuit breaker, the combination of a switch having cooperating contacts adapted to be connected into and control a circuit breaker reclosing control circuit, a movable member mounted adjacent said switch, an energy storing spring connected in driving relation with said movable member and adapted to move said member in a switch operating direction, means responsive to an opening operation of the reclosing circuit breaker adapted to move said movable member against the action of said spring to thereby store energy in said spring, and a trip-free latch between said last means and said movable member adapted to operate upon a complete opening of the reclosing circuit breaker to permit said movable member to move in its switch operating direction under the influence of said energy storing spring and operate said switch, whereby the reclosing control circuit of the reclosing circuit breaker will be reestablished to effect an automatic reclosing of the circuit breaker.

ROY HANMORE GERARD.